(12) United States Patent
Peterson et al.

(10) Patent No.: US 10,082,268 B2
(45) Date of Patent: Sep. 25, 2018

(54) DISPLAY PANEL

(71) Applicant: Liberty Pumps, Inc., Bergen, NY (US)

(72) Inventors: Caleb Peterson, Attica, NY (US);
Randall Waldron, North Chili, NY (US); Timothy D. McCrossen, Rochester, NY (US); Timothy Haats, Ottawa (CA); David M. Williams, Attica, NY (US)

(73) Assignee: Liberty Pumps, Inc., Bergen, NY (US)

( * ) Notice: Subject to any disclaimer, the term of this patent is extended or adjusted under 35 U.S.C. 154(b) by 0 days.

(21) Appl. No.: 15/644,682

(22) Filed: Jul. 7, 2017

(65) Prior Publication Data
US 2018/0010762 A1    Jan. 11, 2018

Related U.S. Application Data

(60) Provisional application No. 62/360,611, filed on Jul. 11, 2016.

(51) Int. Cl.
| | |
|---|---|
| *F21V 3/00* | (2015.01) |
| *F21V 19/00* | (2006.01) |
| *G09F 13/18* | (2006.01) |
| *G09F 13/22* | (2006.01) |
| *G05D 9/12* | (2006.01) |

(52) U.S. Cl.
CPC ............ *F21V 3/00* (2013.01); *F21V 19/00* (2013.01); *G09F 13/18* (2013.01); *G09F 13/22* (2013.01); *G05D 9/12* (2013.01)

(58) Field of Classification Search
CPC .................................................. G02B 6/0093
See application file for complete search history.

(56) References Cited

U.S. PATENT DOCUMENTS

2016/0062025 A1*  3/2016  Chambers ............ G02B 6/0036
                                                                    362/624

* cited by examiner

*Primary Examiner* — Anne Hines
(74) *Attorney, Agent, or Firm* — John M. Hammond; Patent Innovations LLC

(57) ABSTRACT

A visually observable display comprising a circuit board including at least one illuminator emitting light outwardly from a surface of the board, a light transmissive display window pane operable to receive light at an inner surface and transmit the light through an outer surface, and an insert disposed between the illuminator and the display window pane. The insert comprises an elongated light distributing conduit receiving light from the at least one illuminator at a first location in a direction substantially perpendicular to the display window pane, distributing the light transversely through the light conduit along the inner surface of the display window pane, and redirecting the distributed light outwardly along an outer wall of the conduit and outwardly through the window pane. The display may include multiple light illuminators emitting light outwardly from the board surface and into the light distributing conduit at discrete locations along the conduit.

12 Claims, 11 Drawing Sheets

DISPLAY PANEL

CROSS-REFERENCE TO RELATED PATENT APPLICATIONS

This application claims priority from U.S. Provisional Patent Application No. 62/360,611, filed Jul. 11, 2016, the disclosure of which is incorporated herein by reference.

BACKGROUND

Technical Field

Systems for automated monitoring and control of liquid pumps and volume or level of liquid contents of vessels.

Description of Related Art

Liquid handling apparatus are used across a range of industrial, commercial, and residential applications. Many liquid handling apparatus need to be "operational on demand," i.e., when there is a need for liquid to be delivered to or removed from a vessel or other liquid container, it is desirable for the liquid handling apparatus to operate automatically to accomplish the delivery or removal. For example, it is desirable for a sump pump in the basement or ground floor of a residence or commercial building to automatically start up and discharge water from a sump in the event that flooding of the basement begins to occur. Similarly, in instances where sewage must be pumped uphill to a public sewer pipe or to a leach field, it is desirable for a sewage grinding pump in a residence or commercial building to automatically start up and discharge sewage from a sewage holding basin that becomes filled to near capacity. Similar needs for automated liquid handling also arise in industrial applications.

For such "on demand" liquid handling applications, systems for automated monitoring and control of liquid handling apparatus are provided. The communication capabilities of conventional monitoring and control systems are limited in that they require a person who is responsible to ensure the ongoing operability of an automated liquid handling apparatus to either be at the location of the apparatus and observe its operation, or to be at a fixed (and possibly remote) location of a computer or other process controller that is operating the apparatus. Accordingly, there is a need for a liquid handling control system that is fully capable of being monitored and controlled from a remote location using a variety of electronic communication devices. Additionally, for monitoring and controlling a liquid handling apparatus using a display at a fixed location, and possibly at the apparatus location, there is a need for an improved display that more effectively communicates certain key conditions of the apparatus to a person responsible to ensure the ongoing operability of the apparatus, regardless of the location of the person relative to the display.

SUMMARY

In one aspect of the present disclosure, the need for an improved display is met by providing a display comprising a circuit board including at least one illuminator emitting light outwardly from a surface of the board; a light transmissive display window pane operable to receive light at an inner surface and transmit the light through an outer surface; and an insert disposed between the at least one illuminator and the display window pane and comprising an elongated light distributing conduit receiving light from the at least one illuminator at a first location in a direction substantially perpendicular to the display window pane, distributing the light transversely through the light conduit along the inner surface of the display window pane, and redirecting the distributed light outwardly along an outer wall of the conduit and outwardly through the window pane.

In certain embodiments, the display may include a plurality of light illuminators emitting light outwardly from the surface of the board and into the elongated light distributing conduit at discrete locations along the conduit. The elongated light distributing conduit may be formed in a closed ring. In such embodiments, the transversely distributed light from the plurality of light illuminators may be emitted along the entire outer wall of the conduit ring and outwardly through the window pane. The outer wall of the conduit ring may be contiguous with an outer perimeter of the window pane. The ring may be formed in a variety of shapes, such as a circle, an ellipse, a square, a rectangle, or other various polygonal or curvilinear closed shapes.

The elongated light distributing conduit may have a high efficacy of distributing and redirecting light such that the light emitted from the outer wall of the conduit ring and outwardly through the window pane is visible by an observer at an angle of less than 30 degrees with respect to the window pane. In certain embodiments, the light emitted from the outer wall of the conduit ring and outwardly through the window pane is visible by an observer at an angle of less than 10 degrees with respect to the window pane.

BRIEF DESCRIPTION OF THE DRAWINGS

The present disclosure will be provided with reference to the following drawings, in which like numerals refer to like elements, and in which.

Figure 1:
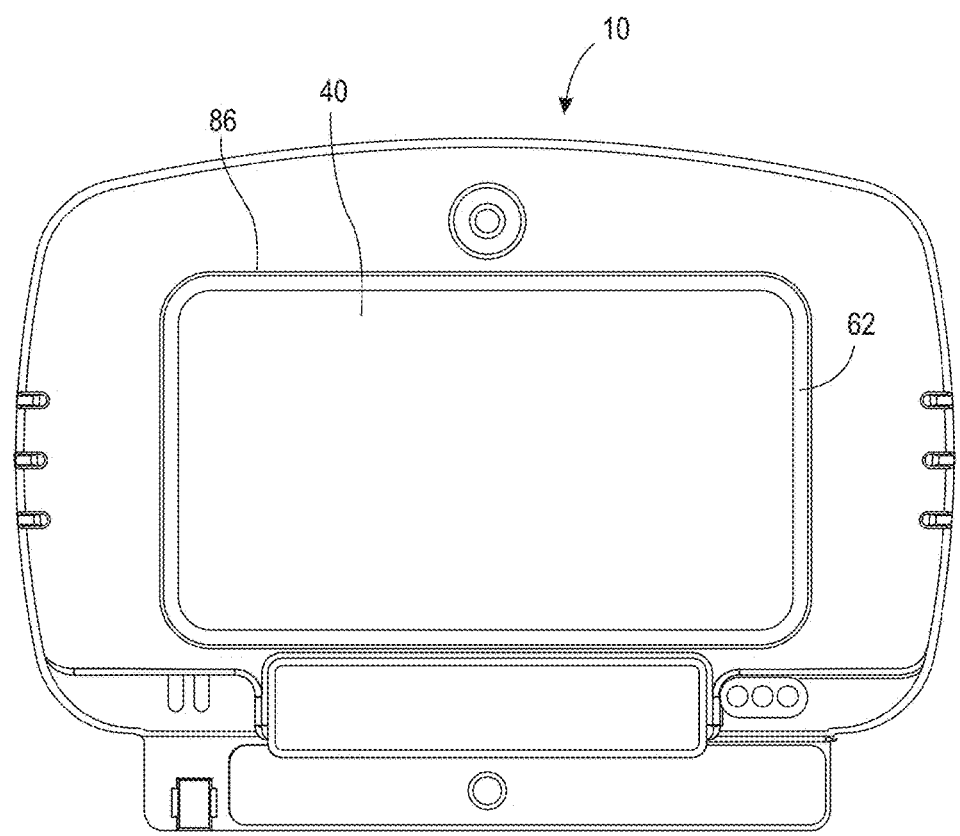
FIG. 1 is a front elevation view of a display of the present disclosure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Figure 2:
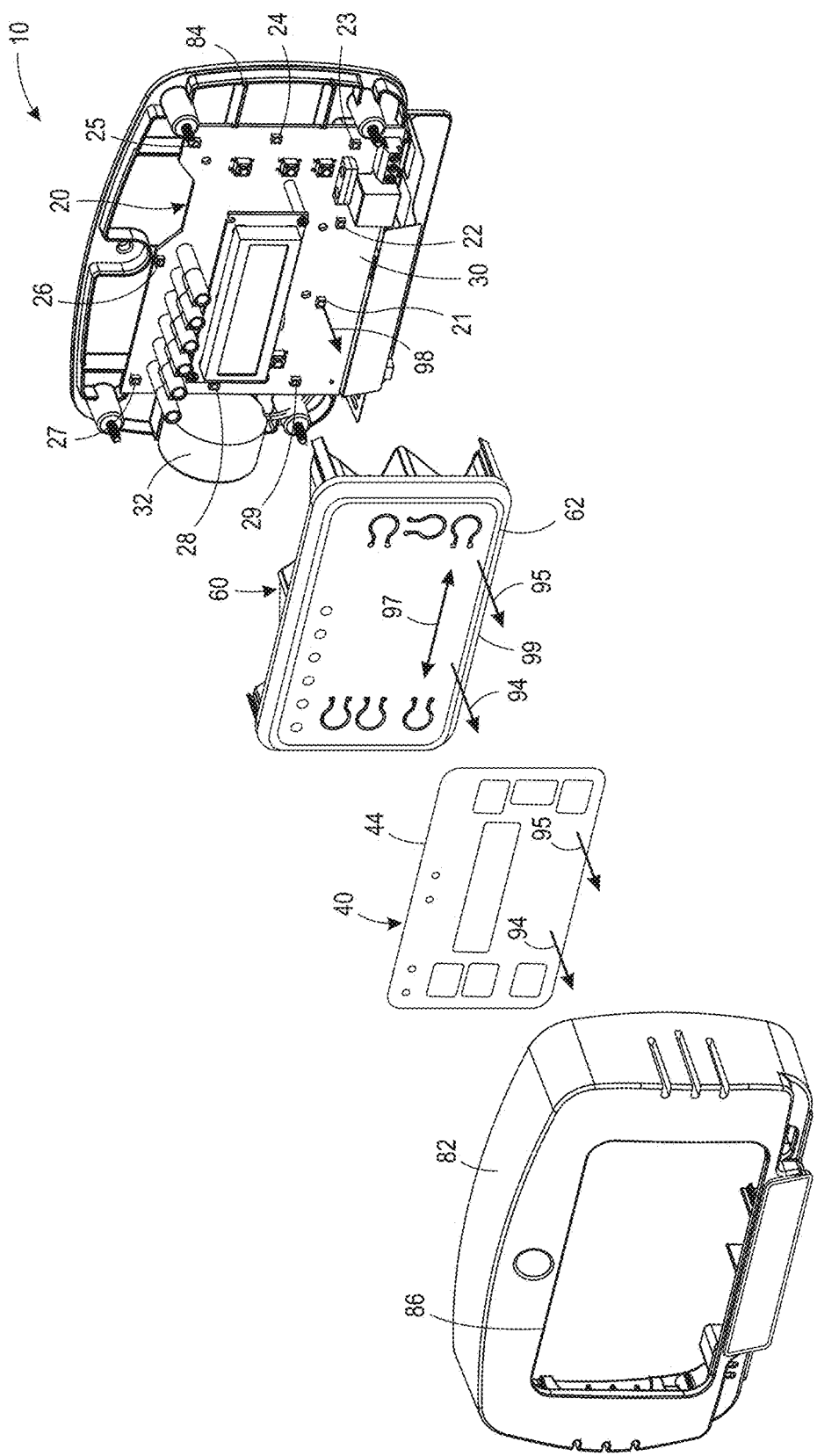
FIG. 2 is an exploded perspective view of the display of FIG. 1, depicting an insert comprising a light ring contained beneath a housing between a screen window pane and a back circuit board and components.

Referring now to FIGS. 1 and 2, an improved display in accordance with the present disclosure is depicted. Display 10 is comprised of a circuit board 20, a light transmissive display window pane 40, and an insert 60 disposed between the circuit board 20 and the display window pane 40. The circuit board 20 and insert 60 may be contained in a housing including front and rear housing portions 82 and 84, with the display window pane 40 being fitted to a window opening 86 in the front housing portion 82.

The circuit board 20 includes at least one illuminator 21 emitting light outwardly from a surface 30 of the board 20. The light transmissive display window pane 40 is operable to receive light at an inner surface and transmit the light through an opposed outer surface 42. The insert 60 is disposed between the at least one illuminator 21 and the display window pane 40. The insert 60 is comprised of an elongated light distributing conduit 62, which receives light from the at least one illuminator 21 at a first location 99 in a direction substantially perpendicular to the display window pane 40 as indicated by arrow 98. The light 99 from the illuminator 21 is distributed transversely as indicated by bidirectional arrow 97 through the light conduit 62 along the inner surface of the display window pane 40. The distributed light is also redirected outwardly through an outer wall of the conduit 62 and outwardly through the window pane 40 as indicated by arrows 94 and 95. Although arrows 94 and 94 indicate a direction substantially perpendicular to the window pane 40, it is to be understood that the elongated light distributing conduit 62 functions to distribute light over a broad range of angles such that the light is visible to an observer of the display who is observing at a highly oblique angle as will be explained subsequently.

In certain embodiments, as shown in FIG. 2, the display may include a plurality of light illuminators 21-29 emitting light outwardly from the surface 30 of the circuit board 20 and into the elongated light distributing conduit 62 at discrete locations along the conduit. The elongated light distributing conduit 62 may be formed in a closed ring, with the light illuminators arrayed along the ring. In alternative embodiments, the light illuminators may be mounted on alternative support members, or be held in place by rigid electrical wires that function as support members. Additionally, it is to be understood that the "closed ring" does not necessarily have to be fabricated from a single conduit piece. In other embodiments, multiple pieces of light distributing conduit may be used, with the ends thereof in proximity to each other, so as to provide the appearance of a ring shape.

Figure 3A:
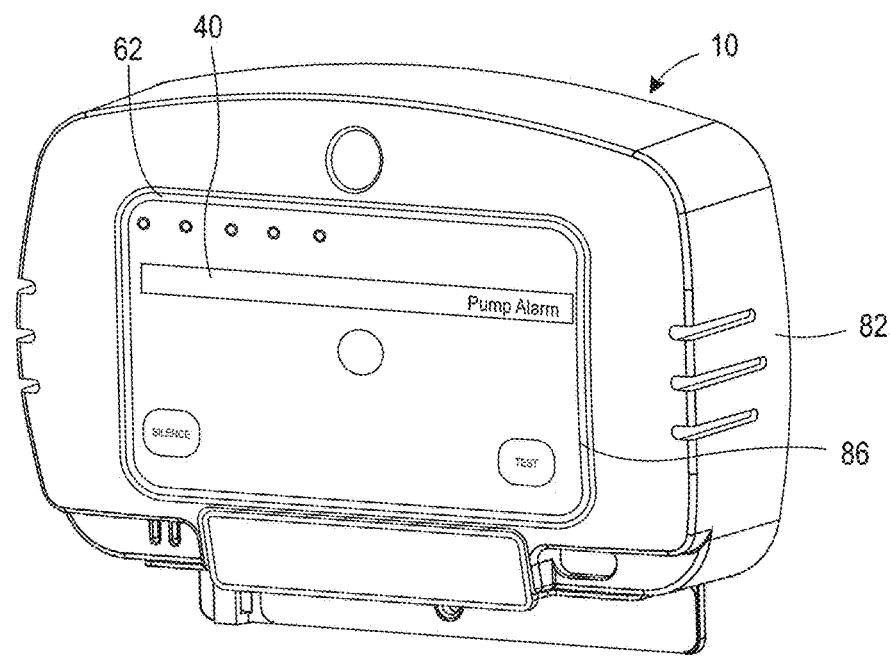
FIG. 3A is a perspective view of the display of FIG. 1 shown with a light ring in an unlit state.
Figure 3B:
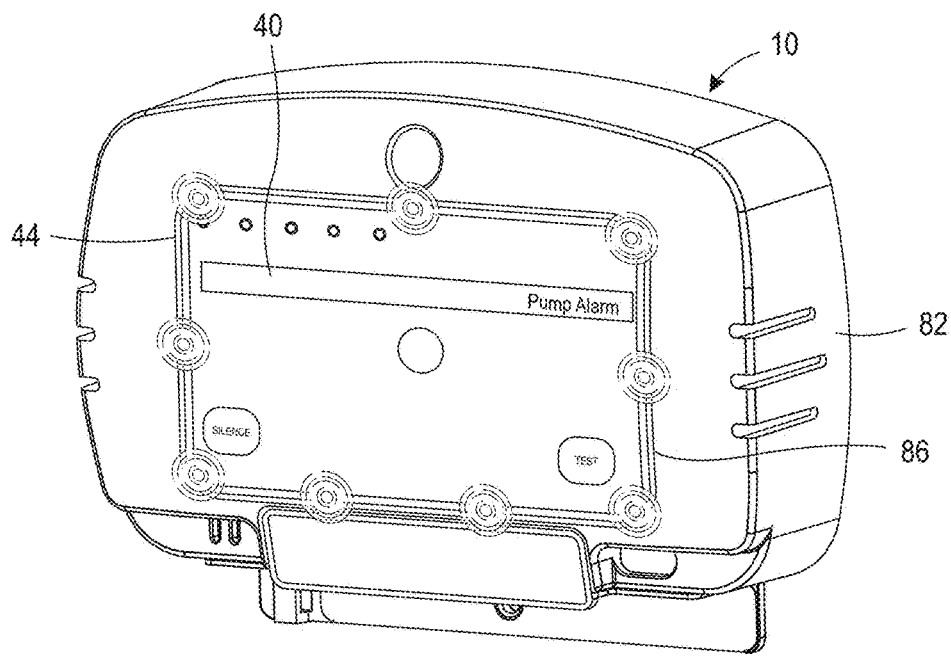
FIG. 3B is a perspective view of the display of FIG. 1 and FIG. 3A shown with the light ring in an illuminated state, emitting light from the entire perimeter thereof.

The effect of such arrangements are best understood with reference to FIG. 3A, which shows the illuminators in an OFF condition, and FIG. 3B, which shows the illuminators in an ON condition. It can be seen from FIG. 3B that in such embodiments, although the light may be more intense at locations proximate to the illuminators 21-29, the transversely distributed light from the plurality of light illuminators 21-29 is emitted along the entire outer wall of the conduit ring 62 and outwardly through the window pane 40. In the embodiment depicted in FIGS. 3A and 3B, the outer wall of the conduit ring 62 is contiguous with the outer perimeter 44 (FIG. 2) of the window pane 40. Although the conduit ring 62 is depicted in FIGS. 1-3B as having a rectangular shape, alternative shapes may be suitable, including shapes such as a circle, an ellipse, a square, or other various polygonal or curvilinear shapes, including numbers, letters, or other symbols.

The light conduit preferably has a high efficacy of distributing and redirecting light such that the light emitted from the outer wall of the conduit ring 62 and outwardly through the window pane 40 may be seen by an observer of the display at a highly oblique angle. In some embodiments, the angle may be less than 30 degrees with respect to the window pane. In other embodiments, the angle may be less than 10 degrees with respect to the window pane. In that manner, the illuminators 21-29, or sub-combinations thereof may be operated to illuminate the perimeter of the window pane 40 in a highly conspicuous manner, so as to call the observer's attention to the display 10 regardless of the location of the observer with respect to the display. This is especially beneficial when an emergency or alarm condition arises in the process operation for which the display is providing information.

The insert 60 and the elongated light distributing conduit 62 may be made of any material that provides the requisite light distributing and redirecting properties. Certain polymers, such as fluorescent acrylic polymers, may be used. Various polymers such as styrene acrylonitrile, polymethylmethacrylate, polycarbonate, polyimide, or polyethylene terephthalate that also include fluorescent dyes may also be used. The elongated light distributing conduit 62 may further include engraved or etched lines on the surface thereof to enhance the effect of directing light out of the conduit.

Figure 4:
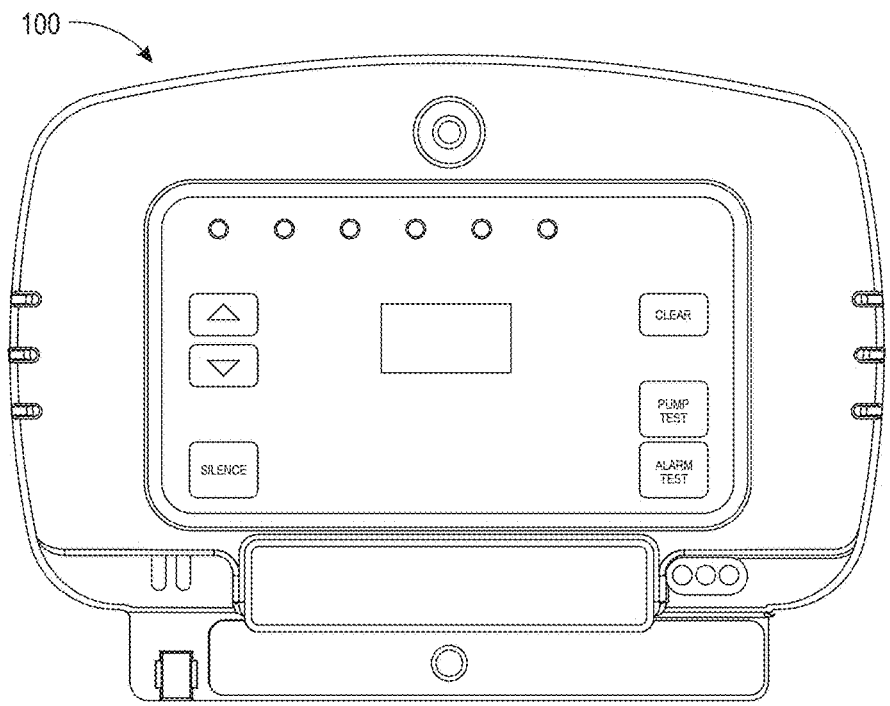
FIGS. 4-18 are schematic illustrations of images of an information display and graphical user interface (GUI) for a liquid handling apparatus monitoring and control system.

Turning now to FIGS. 4-18, a liquid handling information display and control system 100 is depicted in various exemplary modes of operation. The system is capable of being monitored and controlled from a remote location using a variety of electronic communication devices, and may operate a liquid handling apparatus that includes a controller having a DC battery backup. The display may be a display 10 as shown in FIGS. 1-3B and described previously. Alternatively or additionally, the liquid handling control system may be in communication with a display 10, which may be located at the site of the liquid handling process, and the display 10 may in turn be in wireless communication with a second remotely located display. The remotely located display may be provided on a remote computer, a tablet computer, or a smart phone, and the remotely located display may emulate the display 10, and simultaneously communicate the same information to an observer as the site-located display 10. Exemplary modes of operation of the system 100 depicted in FIGS. 4-18 are summarized as follows:

FIG. 4: NO DC POWER/BATTERY MODE/NO BATTERY. The unit does not distinguish between a functional unit in battery mode (i.e. running off of the 9V battery) versus a non-functional unit having a dead battery or no battery.

Figure 5:
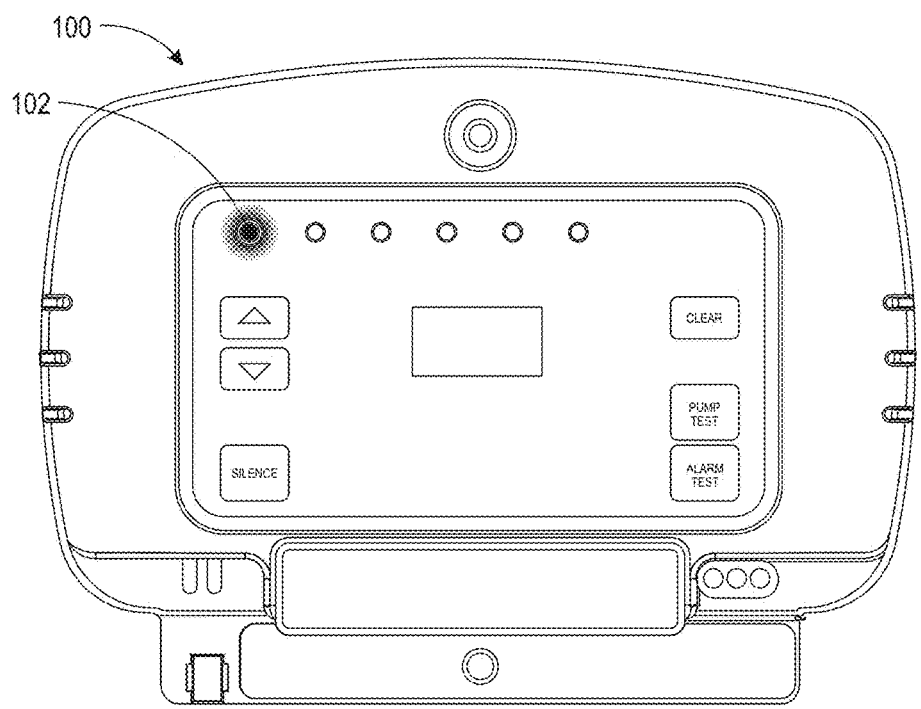

FIG. 5: DC POWER ON. A green POWER indicator light 102 turns on and stays on constantly while the unit is receiving AC power from the power jack.

Figure 6:
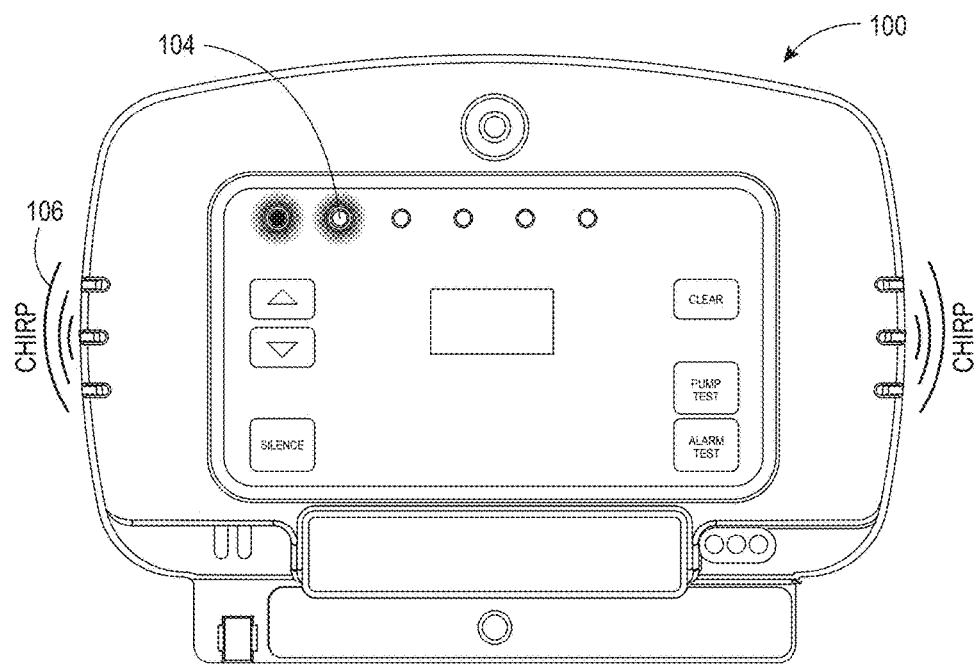

FIG. 6: LOW/DEAD/NO 9V BATTERY. A yellow LOW BATTERY indicator light 104 turns on and slays on constantly, and the audible buzzer "chirps" 106 at a given frequency when the 9V battery is running low or is completely dead.

Figure 7:
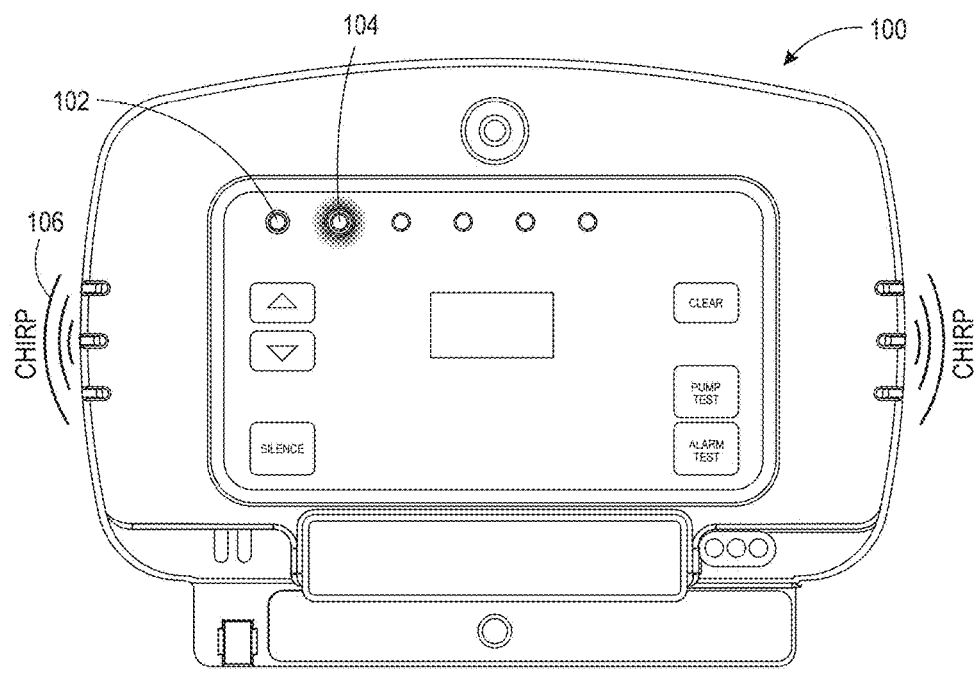

FIG. 7: LOW 9V BATTERY (BATTERY MODE). The yellow LOW BATTERY indicator light 104 turns on and stays on constantly and the audible buzzer "chirps" 106 at a given frequency when the 9V battery is running low. Because this is in battery mode, the green POWER indicator 102 light is off.

Figure 8:
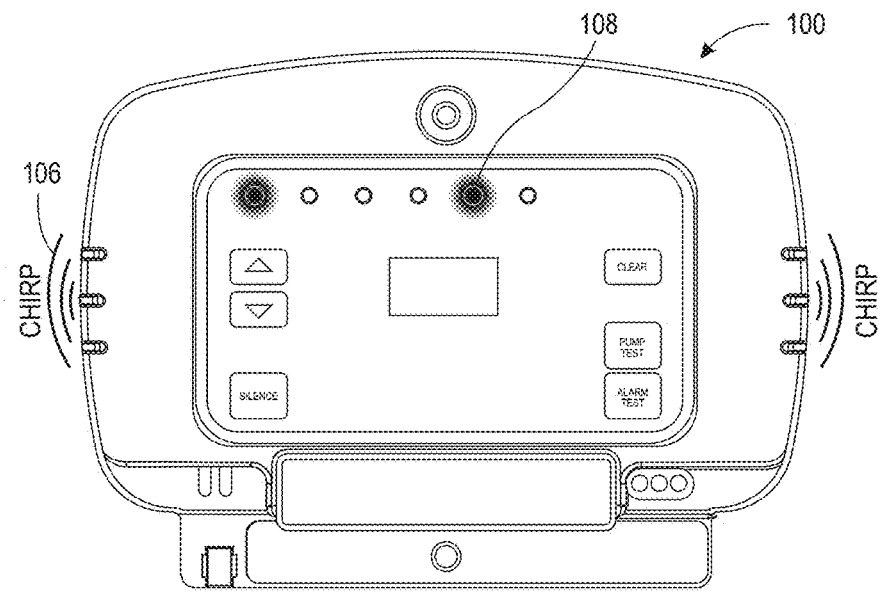

FIG. 8: BACK-UP PUMP RUNNING. In the event that the back-up pump starts running, a blue BU-PUMP ON indicator light 108 turns on and stays on constantly until the pump stops running, and the audible buzzer "chirps" 106 at a given frequency.

Figure 9:
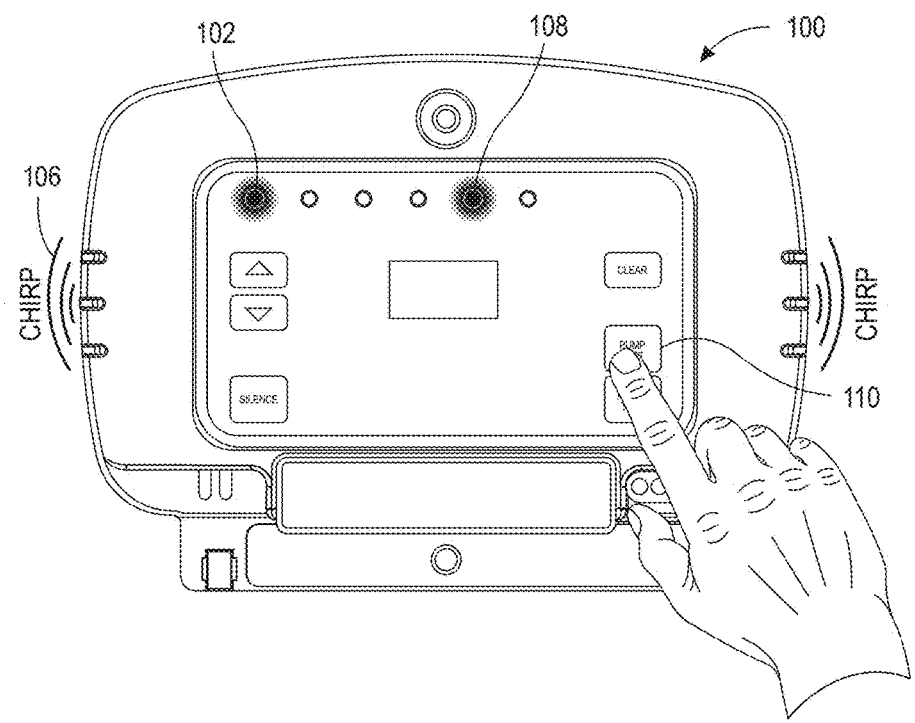

FIG. 9: BACK-UP PUMP TEST. By pressing the PUMP TEST button 110, the back-up pump turns on and runs for the duration in which the button 110 is held down. At the same time, the blue BU-PUMP ON indicator light 108 turns on and the audible buzzer "chirps" 106 at a given frequency. Once the button is released, the back-up pump turns off and stops running.

Figure 10:
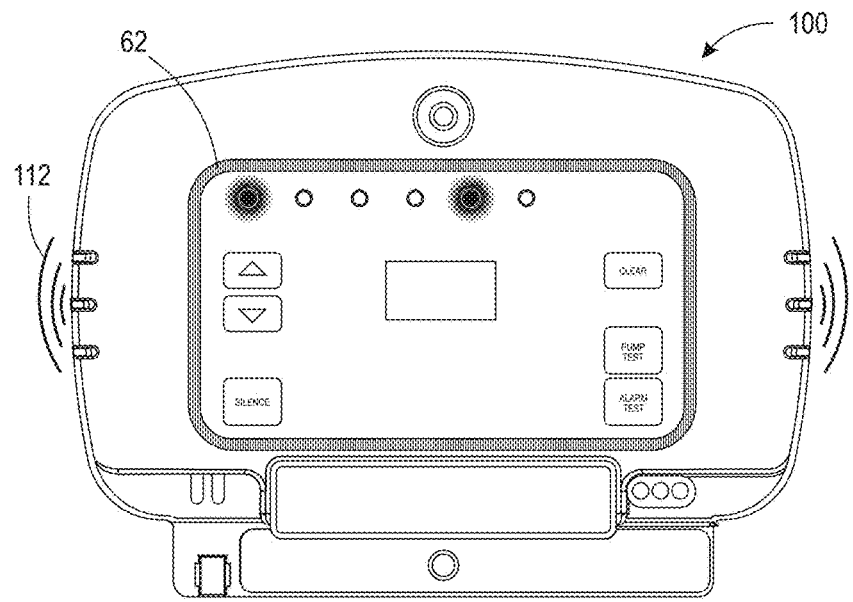

FIG. 10: ALARM SIGNAL. In the event that the sensors trigger an alarm, the unit 100 signals the alarm by making a constant buzzing noise 112 and having the light ring 62 brightly light up and pulsate at a given frequency.

Figure 11:
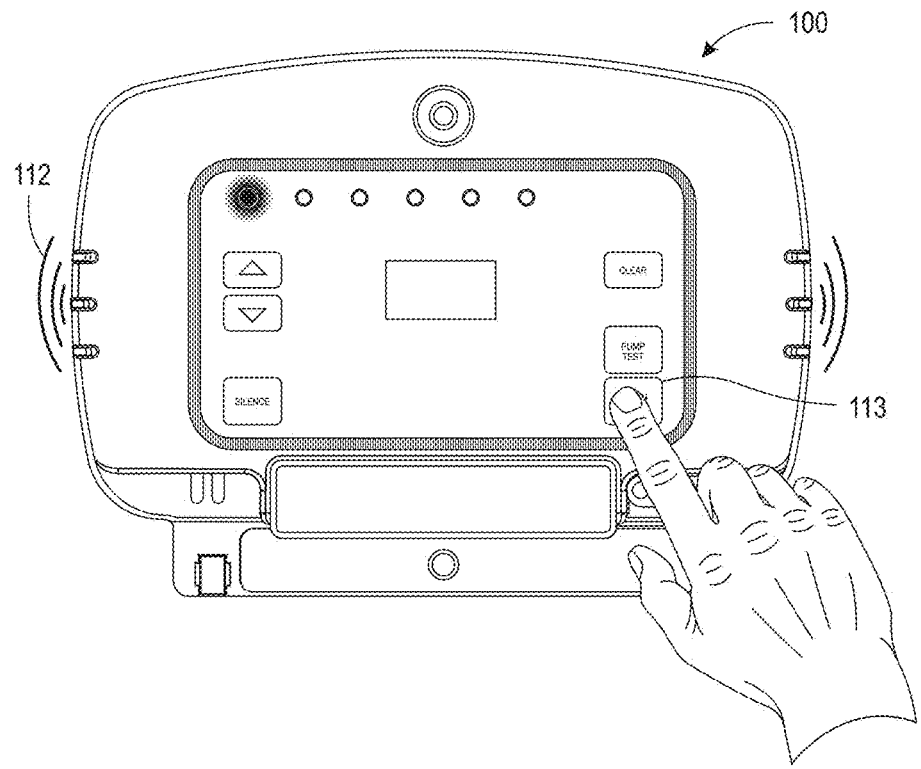

FIG. 11: ALARM TEST. By pressing the TEST button 113, the alarm signal is activated and runs for the duration in which the button 113 is held down. Once the button 113 is released, the alarm signal stops.

Figure 12:
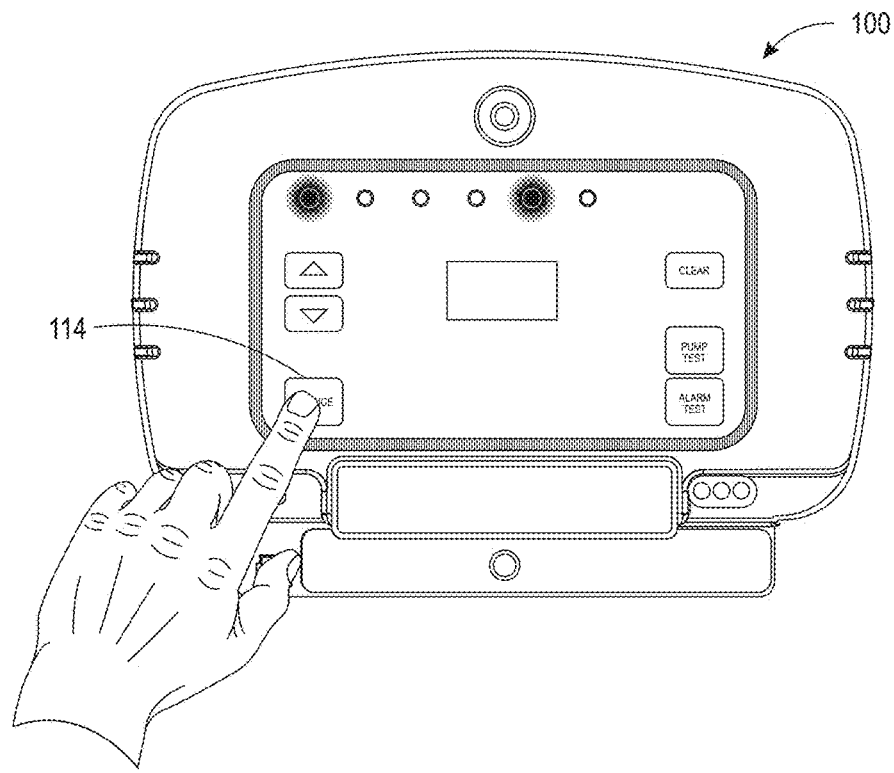

FIG. 12: ALARM SILENCE/UNSILENCE. In the event of an alarm, the audible buzzer 32 (FIG. 2) can be silenced for a specific duration of time by pressing the SILENCE button 114. When the button 114 is pressed a second time, the audible buzzer 32 will be turned back on if the unit 100 is still in an alarm state. When the silence duration has ended and the unit 100 is still in the alarm state, the buzzer 32 will begin to sound again.

Figure 13:
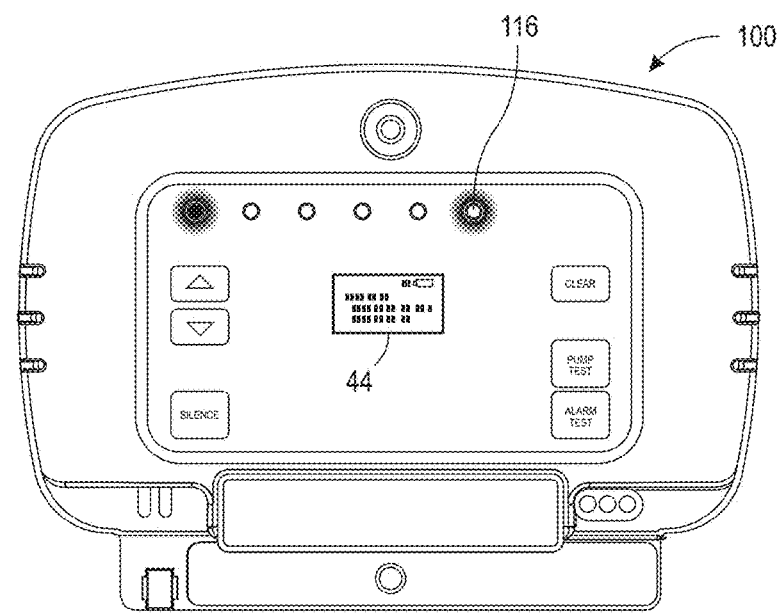

FIG. 13: BACK-UP PUMP FAULTS. In the event there is a fault with the backup pump, a yellow PUMP FAULT indicator light 116 turns on and stays on constantly until the charger/controller unit signals that the fault has been fixed. The faults are then listed on the display screen 44 for review.

Figure 14:
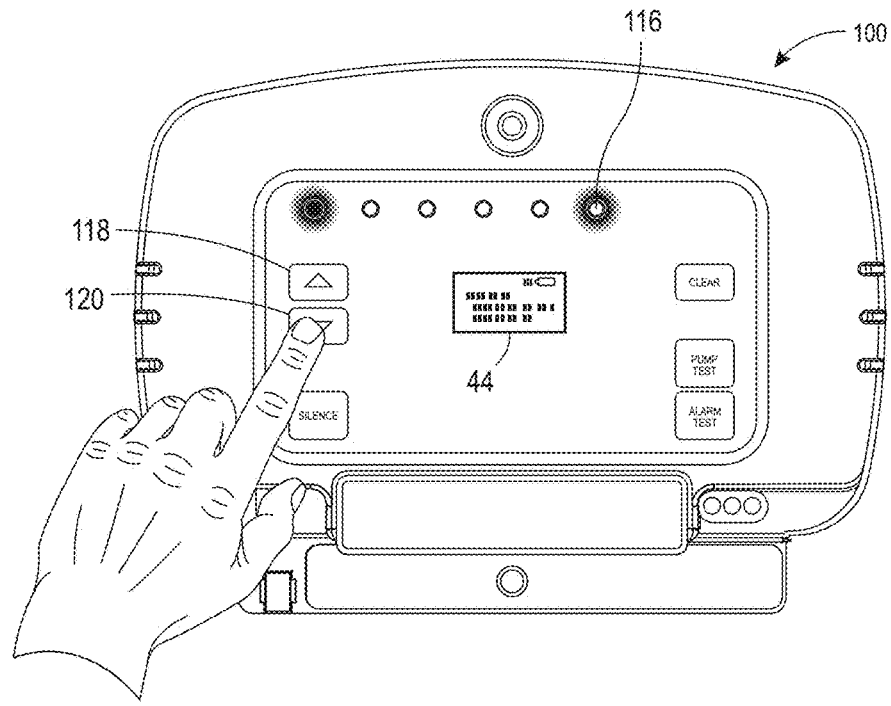

FIG. 14: NAVIGATE SCREEN DISPLAY. The information presented on the display screen 44 can be navigated up and down by pressing the UP and DOWN buttons 118 and 120. Any line-item information that doesn't fit in the screen's horizontal dimension would automatically scroll right to left and back at a given rate.

Figure 15:
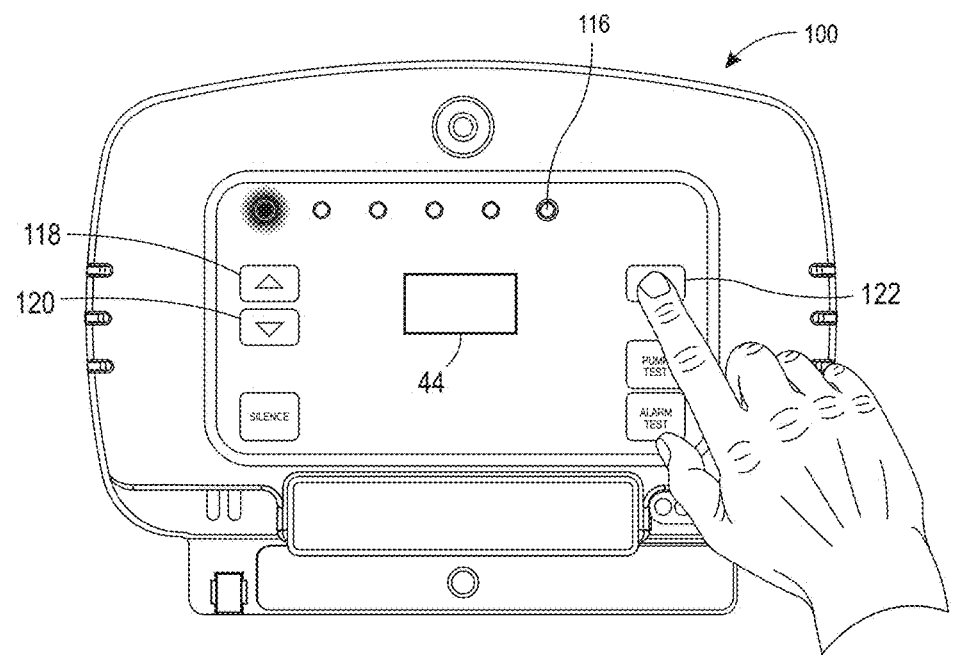

FIG. 15: CLEAR FAULT NOTIFICATIONS. When pump faults have been addressed and the unit has been informed that they have been fixed, the yellow PUMP fault indicator light 116 turns off and the fault information on screen can be cleared by pressing the CLEAR button 122.

Figure 16:
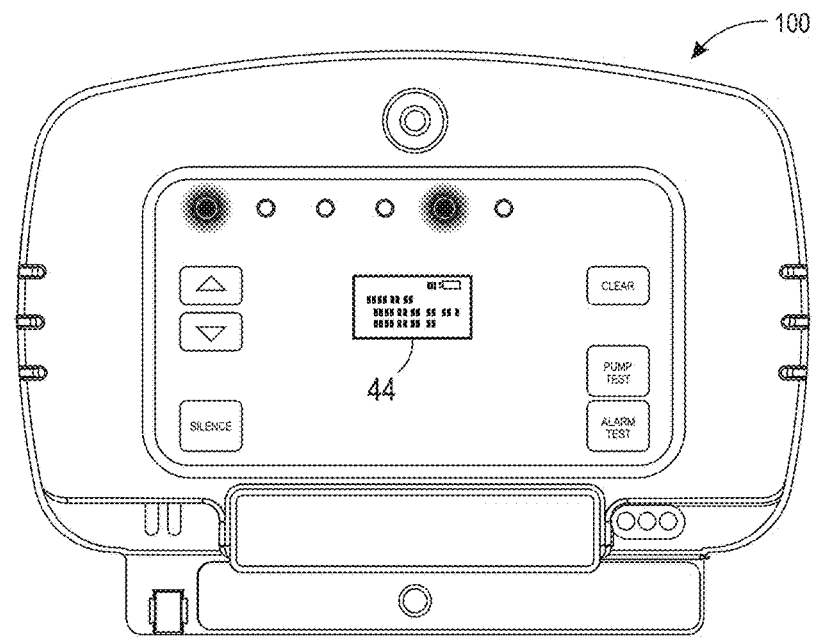

FIG. 16: BACK-UP PUMP 12V BATTERY LOW. If the 12V back-up battery gets low, a notification indicating that the 12V battery is low will blink on the display screen 44.

Figure 17:
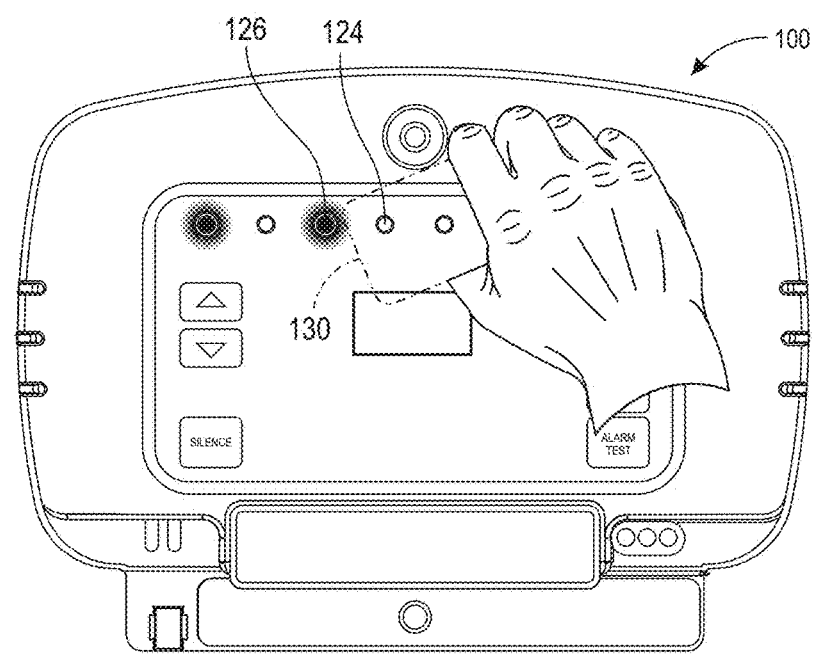

FIG. 17: IMP BLINK-UP PROCESSING. To the WiFi network connection, the IMP programming procedures are followed wherein the screen of a mobile device 130 (phone, tablet, etc.) is placed against a light window 124 labelled SETUP and a series of flashing lights from the screen of the mobile device 130 sends information to the unit. Once the screen of the mobile device 130 stops flashing, the WiFi indicator light 126 runs through the blink-up status patterns.

Figure 18:
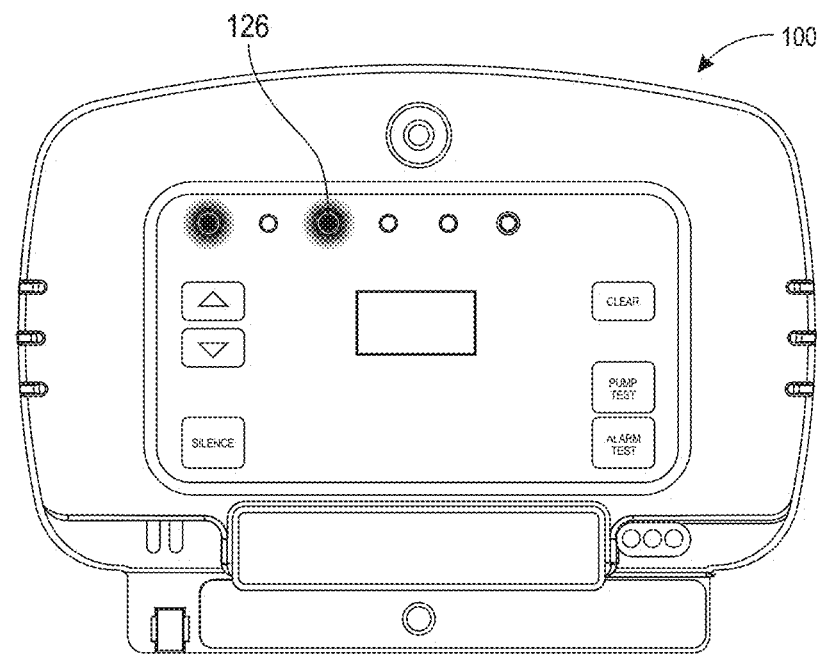

FIG. 18: WIFI CONNECTED. Once the blink-up process is complete, the WiFi indicator light 126 turns green and stays on constantly all the while an Internet connection is maintained. Monitoring and control of the liquid handling apparatus can then be done using the mobile device.

As noted previously, the monitoring and control system 100 may monitor and control a liquid handling apparatus that includes a DC battery backup. The liquid handling apparatus may further include a primary pump controller with an integrated alarm, and a back-up pump controller with an integrated alarm. Under such circumstances, the system 100 integrates wireless connectivity for remote operation, primary pump (115 VAC) control and alarm functions into a single unit. The system 100 may include multiple methods of sending communications/alerts to mobile devices including text messaging (SMS), e-mail, and/or "push" notifications. The system 100 may monitor and control a liquid handling apparatus that includes multiple float switches that signal pump "on", pump "off", and "alarm," and controls for a 115V AC pump. The system 100 may use a sharing method to allow the system 100 to be accessed by multiple users. The system 100 has a primary user identified, and having control of all control settings for controlling the liquid handling apparatus, with additional users registered for receiving alerts of apparatus operating conditions. For example, multiple plumbers may set up alarms and receive alerts of alarms in a customer's home if desired, with a "primary plumber" having control of the liquid handling apparatus, which may be a sump pump or a sewage basing including a sewage grinding pump. The multiple users may access the system using one or more devices (computer, tablet, smart phone, etc.) of their choosing.

Information on the liquid handling apparatus that is remotely accessible via wireless communication by the system 100 includes, but is not limited to, AC power status, 9V battery status, alarm float/sensor status, alarm silence status, WiFi status/signal strength, pump fuse condition, pump "on" float condition, pump "off" float condition, pump current draw, and a pump circuit fault. The system 100 may provide a user with a device in wireless communication with the ability to use such a device to remotely silence an alarm, to show all values/states of "connected information," to disable specific notifications for a set period of time, such as a "snooze" to prevent spam during power outage. The system 100 is also capable of providing a range of notifications to remote users, including but not limited to AC power lost, AC power re-established, 9V battery level low warning, pump circuit fault warning, alarm silenced, high water detected (alarm switch activated), water level OK (alarm switch de-activated), primary pump activated, primary pump deactivated, switch/sensor fault (incorrect combinations of switches activated indicating fault), WiFi connection established, and WiFi connection lost.

It is therefore apparent that there has been provided, in accordance with the present disclosure, an information display and a system for monitoring and controlling a liquid handling apparatus. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. A display comprising:
   a) a support member including a plurality of light illuminators emitting light outwardly;
   b) a light transmissive display window pane operable to receive light at an inner surface thereof and transmit the light through an outer surface thereof; and
   c) an elongated light distributing conduit disposed between the plurality of light illuminators and the display window, the plurality of light illuminators emitting light outwardly and into the elongated light distributing conduit at discrete locations along the light distributing conduit, the elongated light distributing conduit formed in a closed ring and receiving light from the plurality of light illuminators at discrete locations in a direction substantially perpendicular to the display window pane, distributing the light transversely through the elongated light distributing conduit along the inner surface of the display window pane, and redirecting the distributed light outwardly along an outer wall of the conduit and outwardly through the window pane.

2. The display of claim 1, wherein transversely distributed light from the plurality of light illuminators is emitted along the entire outer wall of the conduit and outwardly through the window pane.

3. The display of claim 2, wherein the outer wall of the conduit is contiguous with an outer perimeter of the window pane.

4. The display of claim 3, wherein the ring is formed from a shape selected from a circle, an ellipse, a square, or a rectangle.

5. The display of claim 3, wherein the light emitted from the outer wall of the conduit and outwardly through the window pane is visible by an observer at an angle of less than 30 degrees with respect to the window pane.

6. The display of claim 5, wherein the light emitted from the outer wall of the conduit and outwardly through the window pane is visible by an observer at an angle of less than 10 degrees with respect to the window pane.

7. A display comprising:
   a) a support member including at least one illuminator emitting light outwardly;
   b) a light transmissive display window pane operable to receive light at an inner surface thereof and transmit the light through an outer surface thereof; and
   c) an elongated light distributing conduit disposed between the at least one illuminator and the display window, the elongated light distributing conduit formed in a closed ring and receiving light from the at least one illuminator at a first location in a direction substantially perpendicular to the display window pane, distributing the light transversely through the elongated light distributing conduit along the inner surface of the display window pane, and redirecting the distributed light outwardly along an outer wall of the conduit and outwardly through the window pane.

8. A display comprising:
   a) a support member including at least one illuminator emitting light outwardly;
   b) a light transmissive display window pane operable to receive light at an inner surface thereof and transmit the light through an outer surface thereof; and
   c) an elongated light distributing conduit disposed between the at least one illuminator and the display window, the elongated light distributing conduit receiving light from the at least one illuminator at a first location in a direction substantially perpendicular to the display window pane, distributing the light transversely through the elongated light distributing conduit along the inner surface of the display window pane, and redirecting the distributed light outwardly along an outer wall of the conduit and outwardly through the window pane;
   wherein transversely distributed light from the at least one light illuminator is emitted along the entire outer wall of the conduit and outwardly through the window pane.

9. A display comprising:
   a) a support member including at least one illuminator emitting light outwardly;
   b) a light transmissive display window pane operable to receive light at an inner surface thereof and transmit the light through an outer surface thereof; and
   c) an elongated light distributing conduit disposed between the at least one illuminator and the display window, the elongated light formed in a ring shape and distributing conduit receiving light from the at least one illuminator at a first location in a direction substantially perpendicular to the display window pane, distributing the light transversely through the elongated light distributing conduit along the inner surface of the display window pane, and redirecting the distributed light outwardly along an outer wall of the conduit and outwardly through the window pane.

10. The display of claim 9, wherein the ring shape is formed in a shape selected from a circle, an ellipse, a square, or a rectangle.

11. A display comprising:
    a) a support member including at least one illuminator emitting light outwardly;
    b) a light transmissive display window pane operable to receive light at an inner surface thereof and transmit the light through an outer surface thereof; and
    c) an elongated light distributing conduit disposed between the at least one illuminator and the display window, the elongated light distributing conduit receiving light from the at least one illuminator at a first location in a direction substantially perpendicular to the display window pane, distributing the light transversely through the elongated light distributing conduit along the inner surface of the display window pane, and redirecting the distributed light outwardly along an outer wall of the conduit and outwardly through the window pane;
    wherein the light emitted from the outer wall of the conduit and outwardly through the window pane is visible by an observer at an angle of less than 30 degrees with respect to the window pane.

12. The display of claim 11, wherein the light emitted from the outer wall of the conduit and outwardly through the window pane is visible by an observer at an angle of less than 10 degrees with respect to the window pane.

* * * * *